(12) United States Patent
El-Hibri

(10) Patent No.: US 7,691,926 B2
(45) Date of Patent: Apr. 6, 2010

(54) 4,4'-BIPHENOL POLYSULFONE COMPOSITIONS, PROCESS TO PREPARE THEM, AND ARTICLES MADE THEREOF

(75) Inventor: Mohammad Jamal El-Hibri, Atlanta, GA (US)

(73) Assignee: Solvay Advanced Polymers, L.L.C., Alpharetta, GA (US)

( * ) Notice: Subject to any disclaimer, the term of this patent is extended or adjusted under 35 U.S.C. 154(b) by 654 days.

(21) Appl. No.: 10/539,060

(22) PCT Filed: Dec. 17, 2003

(86) PCT No.: PCT/US03/40117

§ 371 (c)(1),
(2), (4) Date: Feb. 20, 2007

(87) PCT Pub. No.: WO2004/058870

PCT Pub. Date: Jul. 15, 2004

(65) Prior Publication Data

US 2007/0155871 A1 Jul. 5, 2007

Related U.S. Application Data

(60) Provisional application No. 60/433,771, filed on Dec. 17, 2002.

(51) Int. Cl.
C08K 5/524 (2006.01)
C08K 5/5333 (2006.01)

(52) U.S. Cl. ............... 524/126; 524/128; 524/133; 524/135; 524/147; 524/148; 524/149; 524/150; 524/151; 524/152; 524/153

(58) Field of Classification Search ............... 524/126, 524/128, 133, 135, 147–153
See application file for complete search history.

(56) References Cited

U.S. PATENT DOCUMENTS

| | | |
|---|---|---|
| 3,755,256 A | 8/1973 | Beverly |
| 4,902,836 A | 2/1990 | Kissinger |
| 5,086,130 A | 2/1992 | Dickinson et al. |
| 5,164,466 A | 11/1992 | El-Hibri et al. |
| 5,910,560 A | 6/1999 | Nagashima et al. |
| 6,329,493 B1 | 12/2001 | El-Hibri et al. |
| 6,593,485 B1 | 7/2003 | Stoll et al. |
| 2002/0017743 A1 | 2/2002 | Priedeman, Jr. |

FOREIGN PATENT DOCUMENTS

| | | |
|---|---|---|
| DE | 3419376 | 11/1985 |
| GB | 1 398 133 | 6/1975 |
| GB | 2 283 490 | 5/1995 |
| JP | 07-179758 | 7/1995 |
| JP | 11-035705 | 2/1999 |
| SU | 952923 | 8/1982 |
| WO | WO 01/21699 | 3/2001 |
| WO | 03/089520 | 10/2003 |
| WO | WO 03/089519 | 10/2003 |

OTHER PUBLICATIONS

Database WPI, Section Ch. Week 199916, Derwent Publications Ltd., London, GB; AN 1999-186388 XP002397498 and JP 11 035705 (Feb. 9, 1999). Abstract.
Database WPI, Section Ch. Week 199537, Derwent Publications Ltd., London, GB; AN 1995-281108 XP002397499 and JP 07 179758 (Jul. 18, 1995). Abstract.
John Murphy, "Additives for Plastics Handbook", 2nd Edition, Elsevier Advanced Technology, 2001.
Chemical Additives for the Plastics Industry, Properties, Applications, Toxicologies; by Radian Corporation, McLean, Virginia; 1987.
Charles A. Harper, "Modern Plastics", Modern Plastics Handbook, 2000.

*Primary Examiner*—Peter Szekely
(74) *Attorney, Agent, or Firm*—Oblon, Spivak, McClelland, Maier & Neustadt, L.L.P.

(57) ABSTRACT

4,4'-Biphenol polysulfone composition comprising: as main ingredient, at least one polysulfone comprising more than 50 mol. % of recurring units formed by reacting 4,4'-biphenol with at least one sulfone monomer $SM_1$ ($B^{o1}$ PSU), more than 0.01% by weight, based on the total weight of the composition, of at least one phosphorus-containing compound chosen from organic phosphites and organic phosphonites, and at least one polysulfone comprising more than 50 mol. % of recurring units formed by reacting bisphenol A with at least one sulfone monomer $SM_2$ ($B^{o1}$ A PSU). 4,4'-Biphenol polysulfone composition containing at least 60% by weight, based on the total weight of the 4,4'-biphenol polysulfone composition, of at least one $B^{o1}$ PSU, said composition having a melt viscosity ratio at 410° C. and at a shear rate of 50 s$^{-1}$ ($VR_{40}$) of below 1.20. Process which is especially well-suited to prepare the above compositions. Articles made from the above compositions or prepared by the above process.

16 Claims, No Drawings

US 7,691,926 B2

4,4'-BIPHENOL POLYSULFONE COMPOSITIONS, PROCESS TO PREPARE THEM, AND ARTICLES MADE THEREOF

CROSS-REFERENCE TO RELATED APPLICATIONS

The present application is a 371 of PCT/US03/40117, filed Dec. 17, 2003, and claims benefit of U.S. provisional application Ser. No. 60/433,771, filed Dec. 17, 2002.

Polysulfones comprising more than 50 mol. % of recurring units formed by reacting 4,4'-biphenol with at least one sulfone monomer (hereafter $B^{o1}$ PSU) are unique members of the sulfone polymer family. Among the $B^{o1}$ PSU, polyphenylsulfones, i.e. polysulfones comprising more than 50 mol. % of recurring units formed by reacting 4,4'-biphenol with at least one 4,4'-dihalodiphenylsulfone (hereafter PPSU), are of particular interest. $B^{o1}$ PSU provide compositions with mechanical properties which are usually not found in compositions based on other polymers in their temperature class. $B^{o1}$ PSU compositions usually need to be processed at high temperature for good melt flow behaviour; in some fabrication configurations, melt temperatures as high as 400-420° C. are required.

The problem is that, at such high temperatures, the viscosity of $B^{o1}$ PSU itself, and consequently of any usual $B^{o1}$ PSU composition, increases very much over time, and this viscosity rise makes it very difficult to manufacture articles of consistently high quality based on said compositions.

In addition, when manufacturing articles from $B^{o1}$ PSU itself or from a usual $B^{o1}$ PSU composition, it is generally observed that a char layer builds on the walls of tooling that is being used (e.g. in the die in case of an extrusion process, or in the injection nozzle in the case of an injection moulding process); this undesirable char layer grows rapidly over time, and results in the generation of black specks in the articles being fabricated, thereby downgrading their performance and aesthetics. The charring is also responsible for the generation of scrap in the form of black speck laden extrudate. To remove the char layer from the system, a complete shut down and clean up of the fabrication system is needed, which is costly from the standpoint of down time and lost production.

Attempts have already been made to improve the melt stability of various aromatic polysulfones compositions.

GB 1 398 133 discloses that the incorporation of 0.01 to 4% by weight of a phosphite ester can substantially improve the melt viscosity of some varieties of aromatic polysulfones other than $B^{o1}$ PSU.

WO 03/089520, which was filed before but published on or after the priority date of the present application, discloses that organic phosphorus-containing compounds like organic phosphites and phosphonites, commonly referred to as melt stabilising agents, can be advantageously added, together with a colorant and/or an optical brightener, to a PPSU composition, for the purpose of reducing its yellowness and increasing its light transmittance. Amounts of phosphorus-containing compound far below 0.1 wt. % (based on the total weight of the composition) proved sufficient to reach the goal.

Some commercial PPSU grades commercialised by Solvay Advanced Polymers, L.L.C. under the registered name RADEL® R, like Radel® R-5600 NT, consist of virgin PPSU polymer and traces (at most 0.01 wt. %) of organic phosphites and/or phosphonites. Said organic phosphites and/or phosphonites are added during the recovery process of the PPSU from the solvent in which the PPSU is dissolved (just after the polycondensation reaction), in an amount of up to 0.20 wt. % based on the amount of PPSU; however, more than 95% of them are either decomposed into compounds other than organic phosphites and phosphonites, or are lost during said recovery process.

All the prior art PPSU compositions which include an organic phosphite and/or phosphonite compound, although exhibiting sometimes a slightly improved melt stability with regard to usual PPSU compositions (i.e. $B^{o1}$ PSU compositions totally free of phosphite and phosphonite), have still not sufficient melt stability at high temperature, so all the problems and drawbacks met with said usual $B^{o1}$ PSU compositions, such as the charring and the formation of black specks, as above detailed, still occur in an acute way.

It is also prior art to blend PPSU with bisphenol A polysulfone, in particular for lowering the price of the PPSU composition, with a possible drawback on the mechanical properties of the PPSU.

As an illustration thereof, example 3 of US 2002/0017743 discloses a blend of 50 wt. % of Radel® R-5600 NT PPSU, 25 wt. % of Udel® P 1710 NT 15 bisphenol A polysulfone and of 25 wt. % of EMS TR 70 amorphous polyamide (available from EMS-Chemie AG of Switzerland). US 2002/0017743 is silent on a possible impact of bisphenol A polysulfone on the melt stability of the PPSU. More generally, as far as the Applicant knows, no public disclosure deals with the possible impact that a bisphenol A polysulfone could have on the melt stability of the PPSU.

Another illustration thereof is a proprietary blend commercially available from Solvay Advanced Polymers, L.L.C., which consists of 55 wt. % of PPSU and of 45 wt. % of PSU.

It is an objective of the present invention to provide a 4,4'-biphenol polysulfone composition which addresses the problems raised by the prior art $B^{o1}$ PSU compositions as above detailed.

With this end in view, the present invention concerns a 4,4'-biphenol polysulfone composition comprising:
- as main ingredient, at least one polysulfone comprising more than 50 mol. % of recurring units formed by reacting 4,4'-biphenol with at least one sulfone monomer $SM_1$ ($B^{o1}$ PSU),
- more than 0.01% by weight, based on the total weight of the composition, of at least one phosphorus-containing compound chosen from organic phosphites and organic phosphonites, and
- at least one polysulfone comprising more than 50 mol. % of recurring units formed by reacting bisphenol A with at least one sulfone monomer $SM_2$ ($B^{o1}$ A PSU).

That the $B^{o1}$ PSU is the main ingredient of the composition means that its weight fraction in the composition is greater than the weight fraction of any other ingredient which is present in the composition.

The $B^{o1}$ PSU can consist of recurring units formed by reacting 4,4'-biphenol (i.e. 4,4'-dihydroxybiphenyl) as sole diol with $SM_1$. Alternatively, the $B^{o1}$ PSU can comprise less than 50 mol. % of recurring units formed from one or more diols other than 4,4'-biphenol, such as bisphenol A, 4,4'-dihydroxydiphenylsulfone (also known as bisphenol S), hydroquinone and 4,4'-dihydroxydiphenylether.

The $B^{o1}$ PSU comprises preferably more than 75 mol. %, and very preferably more than 90 mol. %, of recurring units formed by reacting 4,4'-biphenol with $SM_1$. It is most preferred that the $B^{o1}$ PSU consists of recurring units formed by reacting 4,4'-biphenol with $SM_1$.

$SM_1$ can be any monomer comprising at least one —S(=O)$_2$— group which is able to undergo a polycondensation reaction with 4,4'-biphenol or any other aromatic dihydroxy compound. More than 50 mol. %, and preferable the totality, of $SM_1$ is chosen preferably from aromatic dihalocompounds comprising at least one —S(=O)$_2$— group, very preferably from 4,4'-dihalodiphenylsulfones and 4,4'-bis(4-halophenylsulfonyl)-1.1'-biphenyls, and still more preferably from 4,4'-dihalodiphenylsulfones.

B$^{o1}$ PSU consisting of recurring units formed by reacting 4,4'-biphenol with at least one monomer chosen from 4,4'-dihalodiphenylsulfones, gave excellent results.

The composition according to the present invention comprises advantageously at least 60%, preferably at least 75% and more preferably at least 85% by weight (based on the total weight of the composition) of the B$^{o1}$ PSU.

The composition according to the present invention comprises advantageously at most 98%, preferably at most 97% and more preferably at most 96% by weight (based on the total weight of the composition) of the B$^{o1}$ PSU.

Still more preferred compositions are those comprising:
either, from 85% to 92% by weight (based on the total weight of the composition) of B$^{o1}$ PSU ; this embodiment (hereafter, embodiment I), is especially well suited for providing hyper melt viscosity-stable compositions, without any substantial drawback of the mechanical properties;
or, more than 92% and up to 96% by weight (based on the total weight of the composition) of B$^{o1}$ PSU; this embodiment (hereafter, embodiment II), is especially well suited for providing compositions of improved melt stability, without any drawback of the mechanical properties.

The most preferred compositions comply with embodiment I.

The organic phosphites can be notably organic monophosphites or organic diphosphites.

A certain class of organic monophosphites consists of those complying with the formula

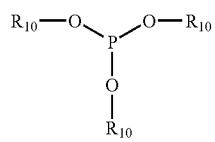

(I)

in which two or three of the R$_{10}$ groups taken together link respectively two or three oxygen atoms of the phosphite group. The linking group can be notably a methylene, a propane-1,2,3-triyl or a propane-1,3-diyl-2-ylidene group. A member of this class is:

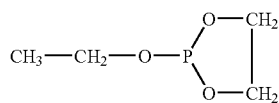

(II)

The organic monophosphites that are preferred are those complying with formula (I) as above defined, in which the R$_{10}$ are selected from hydrogen and hydrocarbyl groups, optionally substituted by one or more halogen atoms, provided that not more than one R$_{10}$ is hydrogen. The hydrocarbyl groups can be notably cycloalkyl, alkyl, aryl, alkylaryl or aralkyl groups.

The organic monophosphites that are very preferred are aromatic. Still more preferred are the tris(optionally alkyl mono- or polysubstituted aryl)phosphites. Excellent results were obtained with tris(2,4-di-t-butyl-phenyl)phosphite:

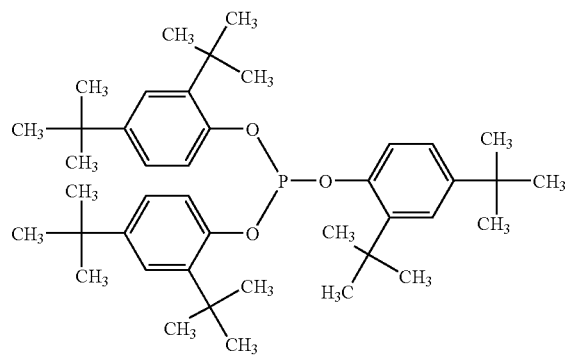

(III)

This phosphite is available commercially from CBI Speciality Chemicals, Inc. under the registered name Irgafos® 168.

Organic diphosphites can consist of compounds derived from formula (I) taken twice, in which two times two R$_{10}$ (two of each formula (I))) taken together link two phosphite groups (one of each formula (I)). Preferred are organic diphosphites wherein the moiety is the pentaerythritol moiety, like distearyl pentaerythritol diphosphite or bis(2,4-dicumyl)pentaerythrytol diphosphite and (2,4-di-t-butylphenyl)-pentaerytiritol diphosphite of formula

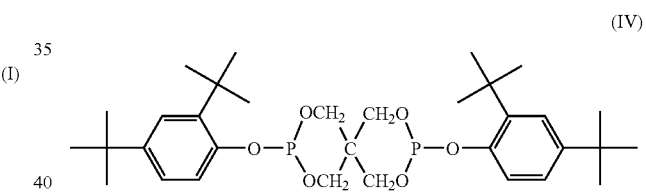

(IV)

The organic phosphonites can be notably organic monophosphonites or organic diphosphonites.

A certain class of organic monophosphonites consists of those complying with formula (V)

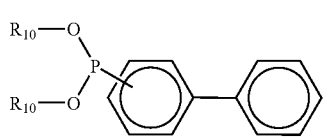

(V)

in which the R$_{10}$ (equal or different) are hydrocarbyl groups, optionally substituted by one or more halogen atoms. The hydrocarbyl groups can be notably cycloalkyl, alkyl, aryl, alkylaryl or aralkyl groups.

Preferred are the organic monophosphonites in which both R$_{10}$ are selected from C$_2$-C$_{12}$ alkyl groups. The organic monophosphonites in which each R$_{10}$ is 2,4-di-t-butyl-phenyl are very preferred.

Organic diphosphonites can consist of compounds of formula

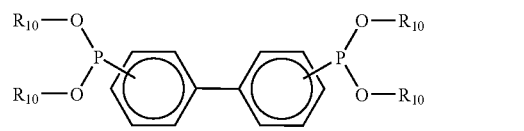
(VI)

the $R_{10}$ (equal or different from each other) as above defined.

Preferred are the organic diphosphonites in which each out of the four $R_{10}$ are selected from $C_2$-$C_{12}$ alkyl groups. The organic diphosphonites in which each $R_{10}$ is 2,4di-t-butyl-phenyl are very preferred.

Any combination of the above organic phosphites and organic phosphonites is also suitable for the purpose of the instant invention.

A preferred combination comprises the following four phosphorous-containing compounds:

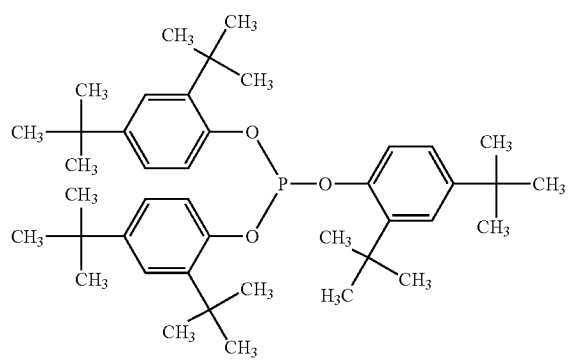
(III)

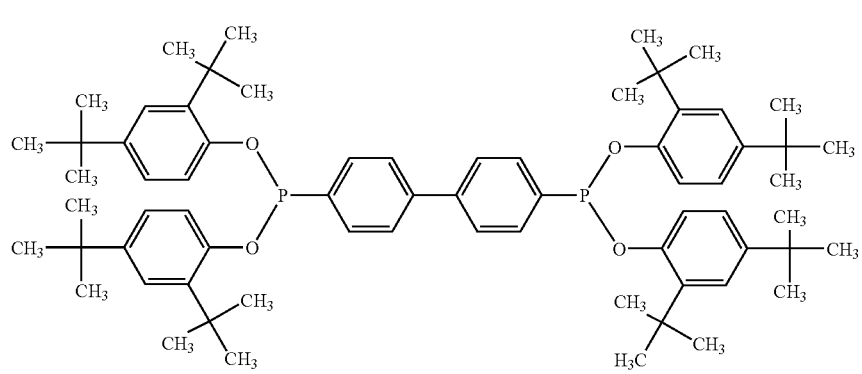
(VII)

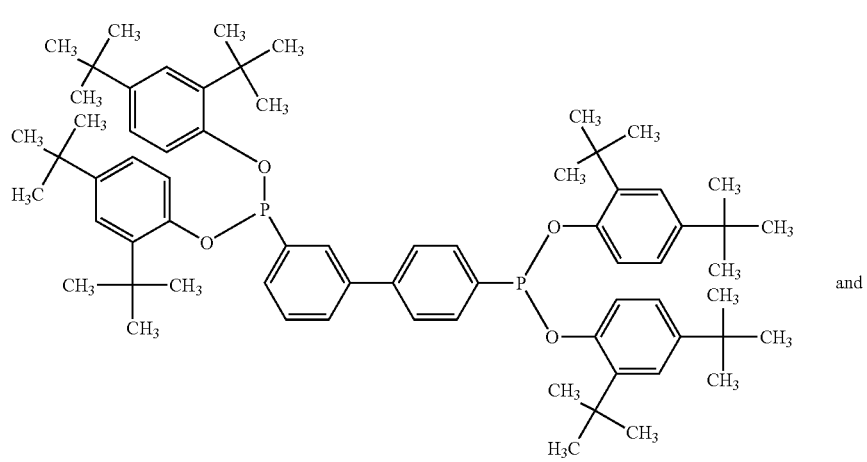
(VIII)

and

-continued

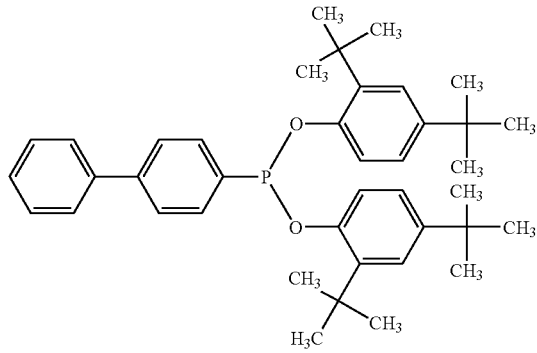

(IX)

Excellent results have been obtained:
on one hand, with a phosphorus-containing combination comprising from about 16 to about 20 wt. % of (III), from about 40 to about 46 wt. % of (VII), from about 16 to about 20 wt. % of (VIII) and from about 12 to about 14 wt. % of (IX); such combination is available commercially from Clariant Corp. under the registered name Sandostab® PEPQ;
on the other hand, with a phosphorus-containing combination comprising from about 58 to about 60 wt. % of (III), from about 20 to about 23 wt. % of (VII), from about 8 to about 10 wt. % of (VIII) and from about 6 to about 7 wt. % of (IX); such combination is possibly a mix of about 50 parts by weight of Sandostab® PEPQ with about 50 parts by weight of Irgafos® 168 phosphorus-containing compounds.

Single organic phosphites or mixtures of organic phosphites (optionally in combination with one or more organic phosphonites), especially tris(2,4-di-t-butyl-phenyl)phosphite (taken alone or in combination with one or more organic phosphonites), have demonstrated superior results over single organic phosphonites or mixtures of organic phosphonites.

The composition according to the present invention comprises preferably above 0.05%, more preferably above 0.09% and still more preferably above 0.12% by weight, based on the total weight of the composition, of the phosphorus-containing compound.

The composition according to the present invention can comprise as much as 0.80, 1.00, 1.50, 2.00, 3.00 or even 5.00 wt. % (based on the total weight of the composition) of the phosphorus-containing compound. It comprises preferably less than 0.60%, more preferably less than 0.40% and still more preferably less than 0.25% by weight (based on the total weight of the composition) of the phosphorus-containing compound.

The $B^{o1}$ A PSU can consist of recurring units formed by reacting bisphenol A (i.e. 4,4'-isopropylidenediphenol) as sole diol with the $SM_2$. Alternatively, the $B^{o1}$ A PSU can comprise less than 50 mol. % of recurring units formed from one ore more diols other than bisphenol A, such as 4,4'-biphenol, 4,4'-dihydroxydiphenylsulfone (bisphenol S), hydroquinone and 4-4'-dihydroxydiphenylether.

The $B^{o1}$ A PSU comprises preferably more than 75 mol. %, and very preferably more than 90 mol. %, of recurring units formed by reacting bisphenol A with $SM_2$. It is most preferred that the $B^{o1}$ A PSU consists of recurring units formed by reacting bisphenol A with $SM_2$.

$SM_2$ can be any monomer comprising at least one —S(=O)$_2$— group which is able to undergo a polycondensation reaction with bisphenol A. More than 50 mol. %, and preferably the totality, of $SM_2$ is chosen preferably from aromatic dihalocompounds comprising at least one —S(=O)$_2$— group, very preferably from 4,4'-dihalodiphenylsulfones and 4,4'-bis[(4-halophenylsulfonyl)-1,1'-biphenyl, and still more preferably from 4,4'-dihalodiphenylsulfones.

$B^{o1}$ A PSU consisting of recurring units formed by reacting 4,4'-biphenol with at least one monomer chosen from 4,4'-dihalodiphenylsulfones, gave excellent results.

The melt flow of the $B^{o1}$ A PSU, which is measured according to ASTM D1238 at 343° C. and under a load of 2.16 kg, is advantageously greater than 4 g/10 min, preferably greater than 8 g/10 min and very preferably greater than 12 g/10 min.

In addition, the melt flow of the $B^{o1}$ A PSU, is advantageously lower than 60 g/10 min, preferably lower than 50 g/10 min and very preferably lower than 40 g/10 min.

Still more preferred is that the melt flow of the $B^{o1}$ A PSU ranges
either, from 12 to 22 g/10 min (this is especially the case for the compositions according to embodiment I as above defined)
or, above 22 and up to 35 g/10 min (this is especially the case for the compositions according to embodiment II as above defined).

It is most preferred that the melt flow of the $B^{o1}$ A PSU ranges above 22 and up to 35 g/10 min.

The composition according to the present invention comprises advantageously at least 1%, preferably at least 2% and more preferably at least 3% by weight, based on the total weight of the composition, of the $B^{o1}$ A PSU.

The composition according to the present invention comprises advantageously at most 39%, preferably at most 24% and more preferably at most 14% by weight, based on the total weight of the composition, of the $B^{o1}$ A PSU.

Still more preferred compositions are those comprising:
either, from 7% to 14% by weight (based on the total weight of the composition) of $B^{o1}$ A PSU ; this range is especially well suited for the compositions according to embodiment I as above defined;
or, less than 7% and down to 3% by weight (based on the total weight of the composition) of $B^{o1}$ A PSU ; this range is especially well suited for the compositions according to embodiment II as above defined.

It is most preferred that the composition according to the present invention comprises from 7% to 14% by weight (based on the total weight of the composition) of $B^{o1}$ A PSU.

Optionally, the composition according to the present invention can further comprise one or more other ingredients, notably to achieve other targeted performance or processing attributes.

These additional ingredients can include but are not limited to fillers, lubricants, mould releases, antistatic agents, flame retardants, anti-fogging agents, matting agents, pigments, dyes and optical brighteners. The composition according to the present invention is preferably free of filler, of pigment and of matting agent.

The composition according to the present invention comprises advantageously less than 30 wt. %, preferably less than 10 wt. % and still more preferably less than 5 wt. % (based on the total weight of the composition) of said additional ingredients; it is most preferred that the composition according to the present invention be essentially free of any of them.

It is another objective of the present invention to provide a 4,4'-biphenol polysulfone composition with an outstanding melt stability at high temperature.

With this end in view, the present invention concerns a 4,4'-biphenol polysulfone composition containing at least 60% by weight, based on the total weight of the 4,4'-biphenol polysulfone composition, of at least one $B^{o1}$ PSU, said composition having a melt viscosity ratio at 410° C. and at a shear rate of 50 s−1 ($VR_{40}$), as determined in the examples of the present application, of below 1.20.

This composition contains advantageously the same ingredients, in the same proportions, at any degree of preference, as the previously described composition, which contained $B^{o1}$ PSU, phosphorus-containing compound and $B^{o1}$ A PSU.

It is still another objective of the present invention to provide a process which is especially well-suited to prepare a 4,4'-biphenol polysulfone composition addressing the problems raised by the prior art $B^{o1}$ PSU compositions as above detailed.

With this end in view, the present invention concerns a process to prepare a 4,4'-biphenol polysulfone composition comprising:

providing (A) as main ingredient of the 4,4'-biphenol polysulfone composition, at least one polysulfone comprising more than 50 mol. % of recurring units formed by reacting 4,4'-biphenol with at least one sulfone monomer $SM_1$ ($B^{o1}$ PSU), providing (B) more than 0.01% by weight, based on the total weight of the 4,4'-biphenol polysulfone composition, of at least one phosphorus-containing compound chosen from organic phosphites and organic phosphonites, providing (C) at least one polysulfone comprising more than 50 mol. % of recurring units formed by reacting bisphenol A with at least one sulfone monomer $SM_2$ ($B^{o1}$ A PSU), and mixing (A), (B) and (C) at the molten state.

The 4,4'-biphenol polysulfone composition prepared by the process according to the present invention complies advantageously with all the characteristics of the compositions according to the present invention, as above detailed.

This implies notably that, in the process according to the present invention, the amount of the phosphorus-containing compound is preferably above 0.05%, more preferably above 0.09% and still more preferably above 0.12% by weight, based on the total weight of the composition.

Finally, it is another objective of the present invention to provide an article made from a $B^{o1}$ PSU composition which solves the problems raised by the prior art articles made from $B^{o1}$ PSU compositions, while maintaining all their beneficial properties.

With this last end in view, the present invention concerns an article made from the above detailed 4,4'-biphenol polysulfone compositions, or prepared by the above described process to prepare a 4,4'-biphenol polysulfone composition.

The article according to the present invention can be semi-finished or finished. It can be a whole article as such or just an element of a more complex article.

The article according to the present invention can be notably (i) a medical or a dental device component such as a steam sterilizable medical tray container or a steam sterilizable surgical handle, (ii) a steam sterilizable lab animal cage (or one of the related ancillary caging components such as a water bottle), (iii) a food service component such as an institutional food serving tray, (iv) an acid or alkali solution container such as a battery case, (v) a component for plumbing or for hot water delivery system such as a fitting or a manifold, (vi) a plumbing fitting for use in food processing, (vii) an aircraft interior component, (viii) an electrical and/or electronic component such as a connector, a circuit board, a switch, a relay, a housing or a magnet wire insulation coating, (ix) an opto-electronic device component such as a lens, a prism or a wave-guide, (x) a fibre optic connector, (xi) an impact resistant safety device such as a helmet, a hard hat or a bump cap, (xii) a semi-finished or finished extruded shape like a plaque, a sheet, a film, a filament, a profile or a tubing.

The article according to the present invention is preferably chosen from medical and dental device components.

The article according to the present invention can be manufactured by any technique which is known by the skilled person. Non limitative examples of such techniques are injection moulding, thermoforming, blow moulding, extrusion, as well as any combination thereof. It is preferably manufactured by an injection moulding process.

The composition according to the present invention exhibits usually an outstanding melt stability at high temperature, i.e. at such high temperatures, the viscosity of the melt composition remains almost constant over time, which makes it easy to manufacture articles based on said composition.

It has been observed that, in the composition according to the present invention, not only the phosphorous-containing compound but also surprisingly the $B^{ol}$ A PSU act as melt stabilisers of the $B^{ol}$ PSU (i.e. both contribute to minimise or prevent viscosity rise at high temperature). Furthermore, in a quite unexpected way for the skilled person, said $B^{ol}$ A PSU and said phosphorous-containing compound, act in a synergetic way, resulting in a composition having an outstanding melt stability; this synergetic effect is highlighted when the phosphorus-containing compound is present in an amount of above 0.05% by weight, based on the total weight of the composition.

In addition to achieving outstanding melt stability, the composition according to the present invention retains usually the key mechanical properties of the $B^{o1}$ PSU; furthermore, it is in general substantially transparent, which increases its versatility and commercial utility for various uses.

It is usually observed that, when processing a composition according to the present invention, no char layer builds on the walls of tooling that is being used for fabrication (e.g., in the die in case of an extrusion process or the injection nozzle in the case of an injection moulding process) or, when such char layer builds, its formation takes a huge amount of time. Then, no more or only very spaced-out shut downs and clean up of the installations are required to remove the char layer. Thereby, the productivity is increased and the lost production minimised.

The article according to the present invention is usually free (or essentially free) of black specks (since no or very few char forms), and has consequently superior performance or aesthetics or both.

EXAMPLE 1 (ACCORDING TO THE INVENTION) AND COMPARATIVE EXAMPLES 1 TO 3

One composition according to the invention (composition E1) and three compositions to the contrary (compositions CE1, CE2 and CE3) were prepared. They consisted of the ingredients listed in Table 1.

TABLE 1

|  | CE1 | CE2 | CE3 | E1 |
|---|---|---|---|---|
| Composition Identifier |  |  |  |  |
| (a) B$^{o1}$ PSU Radel ® R-5600 NT | 100 | 100 | 90 | 90 |
| (b) Phosphorus-containing compound Sandostab ® PEPQ | — | 0.10 | — | — |
| (b') Phosphorus-containing compound Irgafos ® 168 | — | — | — | 0.15 |
| (c) B$^{o1}$ A PSU UDEL ® PXM-98084 | — | — | 10.00 | 9.85 |
| Melt viscosity |  |  |  |  |
| Melt viscosity at $t_o$ + 10 min [410° C./50 sec$^{-1}$] (Pa·s) | 283 | 287 | 261 | 225 |
| Melt viscosity stability VR$_{40}$ [410° C./50 sec$^{-1}$] (—) | 1.59 | 1.24 | 1.30 | 1.12 |
| Mechanical Properties |  |  |  |  |
| Tensile strength (MPa) | 76.3 | 76.6 | 76.5 | 77.0 |
| Tensile modulus (MPa) | 2482 | 2544 | 2454 | 2454 |
| Tensile yield elongation (%) | 7.9 | 7.8 | 7.8 | 7.6 |
| Tensile elongation at break (%) | 103 | 19 | 69 | 83 |

Preparation of the compositions. All of them were prepared by melt compounding in a 25 mm Berstorff co-rotating partially intermeshing twin-screw extruder.

Except for CE1, 10 kg mixes were prepared by tumbling the phosphorus-containing compound (in powder form) and/or the B$^{o1}$ A PSU (in the form of pellets), with the B$^{o1}$ PSU (also in the form of pellets), in sealed 5-gallon plastic buckets for 20 minutes. The B$^{o1}$ PSU grade itself (CE1) or the mixes (E1, CE2 and CE3) were then fed to the throat of the extruder which was run at 220 rpm, and a throughput rate of 11.5 kg/h. The Berstorff machine used consisted of 7 heated barrel sections in addition to the unheated feed throat section. The first heated barrel section was vented to the atmosphere while the sixth heated barrel section was vacuum vented with vacuum levels of 500-650 mm Hg. The heated barrel section temperature settings were: 315/320/350/345/345/340/345° C. for heated barrel sections 1 through 7, respectively. The die used was a double-hole die and was set at 345° C. The melt temperature as measured on polymer extrudate was in the range 390-395° C. The strands exiting the extruder were cooled in a water bath and were cut into pellets using a conventional strand cutting pelletizer.

Determination of the VR$_{40}$ ratio (which quantifies the melt stability of the composition at high temperature). The extrusion compounded pellets to be tested for stability were dried under full vacuum (pressure below 71.12 mm Hg) for at least 3 hours at 150° C. A Kayeness Galaxy V capillary rheometer having a bore diameter of 9.55 mm and equipped with a 20.32 mm long×1.02 mm diameter die was used. The entrance angle of the die was 120 degrees. The rheometer barrel was equilibrated at 410° C., then filled with pellets. The pellets were allowed to melt for 5 minutes, at which time a timer was started (this time is referred hereafter as $t_o$). A viscosity reading at a shear rate of 50 s$^{-1}$ was taken from the rheometer at $t_o$+10 min. At $t_o$+40 min, another reading is taken at the same shear rate. The viscosities at $t_o$+10 min and at $t_o$+40 min were both recorded and the ratio of the viscosity at $t_o$+40 min to the viscosity $t_o$+10 min was calculated; this ratio is the so-called VR$_{40}$. In an ideal composition, VR$_{40}$ should be equal to one.

Determination of mechanical properties. The extrusion compounded pellets were dried overnight for 16 hours in a desiccated air oven at a temperature of 149° C. before they were injection moulded into 0.125 in-thick ASTM tensile bars and Izod impact bars. Injection moulding was performed on a 120-Ton Battenfeld reciprocating screw injection moulding machine using barrel temperature settings of 350, 350 and 355° C. for the rear, mid and front barrel sections, respectively. The nozzle temperature was set at 360° C. The melt temperature was 390° C. and the mould temperature was 148° C. An injection pressure of 75 bar was used. Screw speed for resin plastication was set at 250 rpm and the moulding cycle time was 35 seconds.

Tensile strength, tensile modulus, tensile yield elongation and tensile elongation at break were measured according to ASTM method D638.

Results on melt viscosity and mechanical properties. E1 achieved an outstanding melt viscosity stability ratio VR$_{40}$ at 410° C. of 1.12, approaching the ideal viscosity ratio of 1.00. Thereby, it achieved a roughly four fold improvement in melt stability over CE1, more than a two fold improvement in melt stability over CE3, and not less than a two fold improvement in melt stability over CE2. In addition, E1 achieved a high level of mechanical properties, very similar to that of compositions CE1, CE 2 and CE3.

Example 1' (according to the invention) and comparative examples 1' to 3'—Assessment of the char formation. Compositions E1', CE1', CE2' and CE3', having exactly the same chemical nature as respectively compositions E1, CE1, CE2 and CE3, were prepared at a larger scale (semi-pilot scale) using a W&P ZSK-40 twin screw extruder, with 12 barrels or temperature zones (B1 to B12). The set point temperatures were respectively: 200° C. in B1 (feed zone), 330° C. from B2 to B4, 340° C. from B5 to B6 and 345° C. from B7 to B12. The first heated barrel section was vented to the atmosphere while the other heated barrel section were vacuum vented. The screw speed was 300 rpm. All the compositions were processed in exactly the same conditions.

When comparative example 1' was run in the above extrusion process with melt temperatures approaching 420° C. charring, and pluggage of die tooling with black specks plugging the extrusion nozzle orifice after relatively short run durations were observed. Essentially the same happened when running comparative examples 2' and 3', but after a slightly longer run and with a slightly less intensity. Conversely, when example 1 was run in the same process in the same operating conditions, neither pluggage of die tooling nor black specks plugging the extrusion nozzle orifice were observed even after a long time.

The invention claimed is:

1. A 4,4'-biphenol polysulfone composition comprising a synergistic melt stability enhancing combination of:
at least 60% by weight, based on total weight of the composition, of at least one polysulfone comprising more than 50 mol. % of recurring units formed by reacting 4,4'-biphenol with at least one sulfone monomer SM$_1$ (B$^{o1}$PSU);

more than 0.01% by weight, based on the total weight of the composition, of at least one phosphorus-containing compound consisting of (a) one or more organic phosphites and one or more organic phosphonites; or (b) tris(2,4-di-t-butyl-phenyl)phosphate; or (c) tris(2.4-di-t-butyl-phenyl)phosphite and one or more organic phosphonites; and at least 1% by weight, based on total weight of the composition, of at least one polysulfone comprising more than 50 mol. % of recurring units formed by reacting bisphenol A with at least one sulfone monomer $SM_2$ ($B^{ol}$ A PSU).

2. The composition according to claim 1, wherein $SM_1$ comprises a 4,4'-dihalodiphenylsulfone.

3. The composition according to claim 1, wherein the $B^{ol}$ PSU consists of recurring units formed by reacting 4,4'-biphenol with at least one 4,4'-dihalodiphenylsulfone.

4. The composition according to claim 1, wherein $SM_1$ comprises a 4,4'-bis(4-halophenylsulfonyl)-1,1'-biphenyl.

5. The composition according to claim 1, wherein the $B_{ol}$ PSU consists of recurring units formed by reacting 4,4'-biphenol with at least one 4,4'-bis(4-halophenylsulfonyl)-1,1'-biphenyl.

6. The composition according to claim 1, which comprises at least 85% by weight, based on the total weight of the composition, of the $B^{ol}$ PSU.

7. The composition according to claim 1, wherein the phosphorus-containing compound consists of one or more organic phosphites and one or more organic phosphonites.

8. The composition according to claim 1, wherein the phosphorus-containing compound consists of tris(2,4-di-t-butyl-phenyl) phosphite.

9. The composition according to claim 1, wherein the phosphorus-containing compound consists of tris(2,4-di-t-butyl-phenyl)phosphite and one or more organic phosphonites.

10. The composition according to claim 1, which comprises between 0.09% and 0.40% by weight, based on the total weight of the composition, of the phosphorus-containing compound.

11. The composition according to claim 1, which comprises from 3% to 14% by weight, based on the total weight of the composition, of the $B^{ol}$ A PSU.

12. The composition according to claim 1, which has a melt viscosity ratio at 410°C. and at a shear rate of 50 $s^{-1}$ ($VR_{40}$) of below 1.20.

13. An article comprising the composition according to claim 1.

14. The article according to claim 13, which is manufactured by an injection moulding process.

15. An article comprising the composition according to claim 4.

16. The composition according to claim 1, which comprises more than 0.05% by weight, based on the total weight of the composition, of the phosphorus-containing compound.

* * * * *

UNITED STATES PATENT AND TRADEMARK OFFICE
CERTIFICATE OF CORRECTION

PATENT NO. : 7,691,926 B2  Page 1 of 1
APPLICATION NO. : 10/539060
DATED : April 6, 2010
INVENTOR(S) : Mohammad J. El-Hibri It is certified that error appears in the above-identified patent and that said Letters Patent is hereby corrected as shown below:

Claim 1, Column 13, line 7, "(b) tris(2,4-di-t-butyl-phenyl)phosphate; or"
should read --(b) tris(2,4-di-t-butyl-phenyl)phosphite; or--

Signed and Sealed this

Twenty-ninth Day of June, 2010

David J. Kappos
*Director of the United States Patent and Trademark Office*